United States Patent [19]

Mäyränen et al.

[11] Patent Number: 5,421,212
[45] Date of Patent: Jun. 6, 1995

[54] METHOD AND DEVICE IN ACOUSTIC FLOW MEASUREMENT FOR ENSURING THE OPERABILITY OF SAID MEASUREMENT

[75] Inventors: Tarmo Mäyränen; Sauli Koukkari, both of Muurame, Finland

[73] Assignee: Instrumenttitehdas Kytola Oy, Finland

[21] Appl. No.: 162,001

[22] PCT Filed: Mar. 25, 1993

[86] PCT No.: PCT/FI93/00121

§ 371 Date: Dec. 3, 1994

§ 102(e) Date: Dec. 3, 1994

[87] PCT Pub. No.: WO93/21500

PCT Pub. Date: Oct. 28, 1993

[30] Foreign Application Priority Data

Apr. 14, 1992 [FI] Finland .................................. 921679

[51] Int. Cl.⁶ .................................................. G01F 1/00
[52] U.S. Cl. .................................. 73/861.29; 73/861.28
[58] Field of Search ............ 73/861.27, 861.28, 861.29, 73/861.31

[56] References Cited

U.S. PATENT DOCUMENTS

| | | | |
|---|---|---|---|
| 3,537,309 | 11/1970 | Geohegan | 73/861.29 |
| 3,844,170 | 10/1974 | Critten | 73/194 E |
| 3,974,693 | 8/1976 | Hardies | 73/861.28 |
| 4,015,470 | 4/1977 | Morrison . | |
| 4,022,058 | 5/1977 | Brown | 73/861.28 |
| 4,445,389 | 5/1984 | Potzick et al. | 73/861.27 |
| 4,596,133 | 6/1986 | Smalling . | |
| 5,228,347 | 7/1993 | Lowell et al. | 73/861.28 |

FOREIGN PATENT DOCUMENTS

| | | |
|---|---|---|
| 077285 | 4/1983 | European Pat. Off. . |
| 76885 | 8/1988 | Finland . |
| 1201077 | 9/1965 | Germany . |

*Primary Examiner*—Richard F. Chilcot, Jr.
*Assistant Examiner*—R. Biegel
*Attorney, Agent, or Firm*—Jones & Askew

[57] ABSTRACT

A method and device for acoustic flow measurement of the flow velocity of gases is disclosed. An acoustic signal is transmitted into the measurement pipe and, under ideal working conditions, the signals are detected both upstream and downstream by means of two sound detectors mounted at a certain distance from each other within the measurement pipe, the flow velocity of the gas in the measurement pipe being determined by means of correlation of the sound signals. A standardized sound speed in the medium at rest is stored in memory, and whenever one of either the upstream or downstream travel times cannot be measured due to a disturbance, the flow velocity is computed from a single travel time, either downstream or upstream, and by means of the sound speed at rest stored in memory.

10 Claims, 1 Drawing Sheet

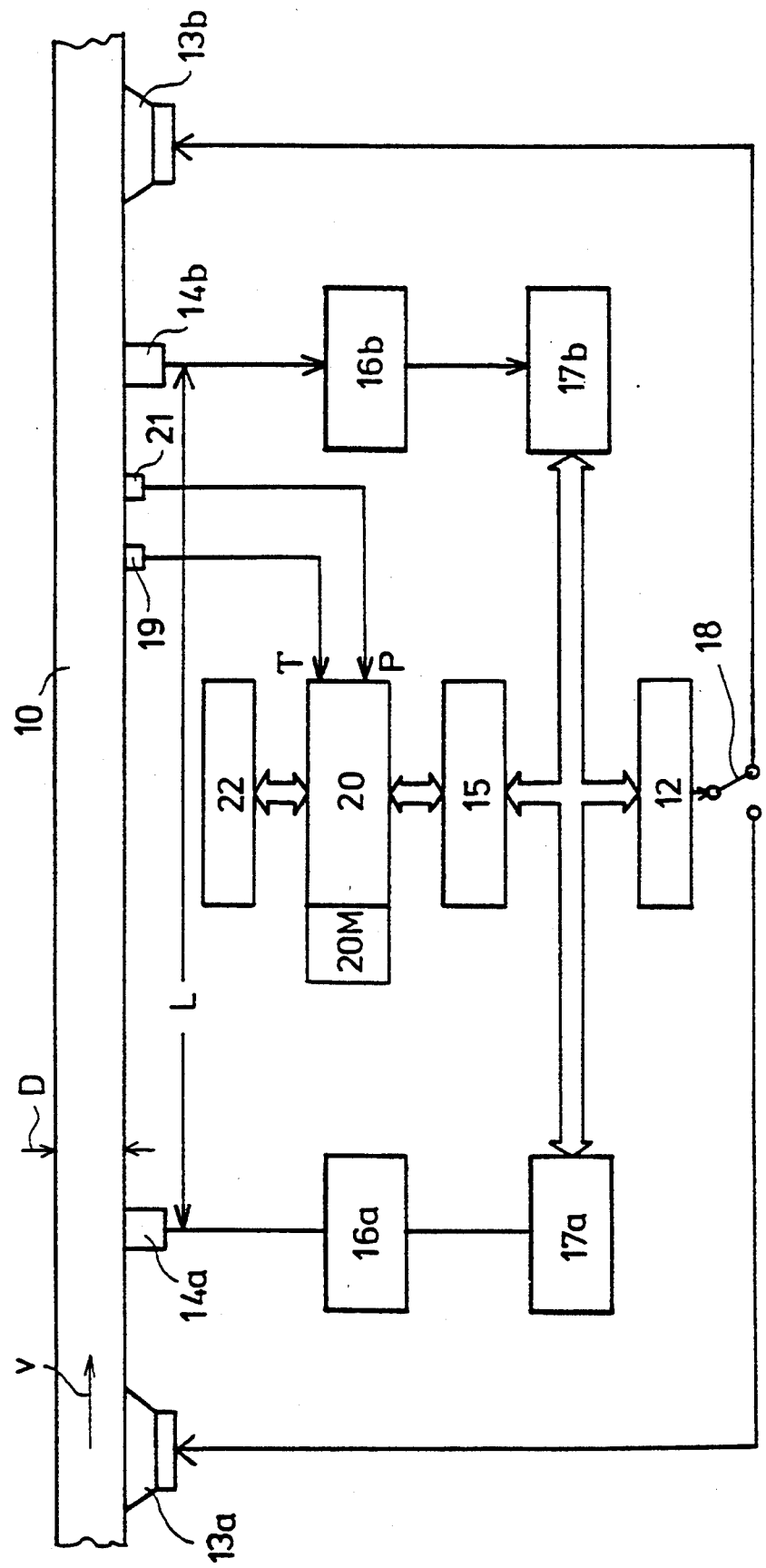

METHOD AND DEVICE IN ACOUSTIC FLOW MEASUREMENT FOR ENSURING THE OPERABILITY OF SAID MEASUREMENT

The invention concerns a method for acoustic flow measurement for measurement of the flow velocity of gases and/or of quantities derived from same, in which method a long-wave sound is transmitted into the measurement pipe and, by means of two sound detectors placed at a certain distance from one another in connection with the measurement pipe, the sound signals that propagate in the gas flow downstream and/or upstream are detected, the flow velocity of the gas that flows in the measurement pipe being determined by means of said sound signals, preferably with correlation.

Further, the invention concerns a device for measurement of the gas flow velocity and/or of quantities derived from same, such as volumetric flow and/or mass flow, which device comprises a measurement pipe, in which the gas flow to be measured runs, which device comprises a loudspeaker or loudspeakers as the transmitters of the sound signals and microphones as the sound detectors, said microphones being placed in connection with the measurement pipe at a certain known distance from one another, and which device comprises a signal generator or equivalent, by whose means electric signals are fed to said loudspeaker or loudspeakers, and which device comprises a correlator, to which the signals received from said microphones are fed.

From the FI Patent No. 76,885 of the Technical Research Centre of Finland (Valtion teknillinen tutkimuskeskus VTT), a method and a device of acoustic flow measurement are known for measurement of the flow velocities, volumetric flows, and/or mass flows of gases, liquids, and/or multi-phase suspensions in a pipe or in an equivalent wave tube by making use of acoustic waves propagating downstream and upstream. In this prior-art method and device, the wide-band acoustic signal coming from the sound sources is made to propagate in the measurement pipe or equivalent wave tube in the plane-wave mode both downstream and upstream, and the flow velocity is determined on the basis of the sound transit times obtained from the maxima and/or the minima of the correlation functions of the measured sound signals and on the basis of the mutual distance between the measurement points.

In one technical solution described in said FI patent, the sound is fed into the measurement pipe in the form of a frequency sweep, and the transit time of sound is determined from the signals of the microphones placed at the ends of the measurement interspace by means of a polarity correlator. From the transit times measured downstream and upstream, it is possible to measure both the average flow velocity and the sound speed in a medium at rest with high accuracy. Moreover, if necessary, from the flow velocity and from the cross-sectional area of the pipe, it is possible to calculate the volumetric flow rate. A gas flow velocity measured in accordance with said FI patent or in some other way is, as a rule, used as starting information, together with the temperature and the pressure of the gas, for computing of the mass flow rate. Thus, measurement of the flow velocity is, as a rule, combined with measurement of the temperature and of the pressure of the gas.

It is well known that the sound speed in a gas mainly depends on the composition and temperature of the gas. The composition affects the sound speed mainly by the intermediate of the average molecular weight, and to some extent also by the intermediate of the number of degrees of freedom in the molecules, i.e. of the number of atoms present in a molecule.

In the applicant's FI Patent Applications Nos. 916102 and 916103, a method and a device are described for measurement of the flow velocity of a gas and/or of quantities that can be derived from same. In the latter FI application, a method and a device are described for monitoring of a gas flow, in particular of a natural-gas flow, in particular for monitoring of the composition of the gas. In the method of the FI Pat. Appl. 916103, it has been considered novel that, in the method, an oscillation of sound frequency is applied to the gas flow pipe downstream and upstream, and the transit times of the monitoring sound over a certain measurement interspace downstream and upstream are detected, that the sound speed or a quantity representing same is determined on the basis of said transit times, which speed or quantity is mainly dependent on the average molecular weight of the gas to be monitored, and that, when said sound speed or the quantity representing same differs from its range of expected values, an alarm signal or some other control signal is given. On the other hand, in the device in accordance with said FI application, it has been considered novel that the device comprises a measurement pipe, in which the gas flow to be measured runs, that the device comprises loudspeakers as the transmitters of the sound signals and microphones as the sound detectors, which microphones are placed in connection with the measurement pipe between said loudspeakers at a certain known distance from one another, and that the device comprises units by whose means both the gas flow velocity and the speed of sound in the gas flow are determined, and that the device comprises an alarm unit, which is fitted to produce an alarm when the detected sound speed or the quantity representing same is above or below certain preset limit values.

The principal object of the present invention is further development of the methods and devices suggested in said FI Patent No. 76,885 and in the applicant's said FI Patent Applications, the primary aim being to ensure the operability of the flow measurement in various situations of disturbance.

From a natural-gas flowmeter intended for invoicing operation, high known precision within a wide flow range as well as high reliability of operation are required. If the meter becomes completely inoperable for a certain period of time, it cannot produce any information on the quantity of gas flowing during said period of time.

In practice, it may happen that, owing to failure of a loudspeaker or owing to a strong interfering noise coming from one direction, it is possible to measure one of the necessary transit times of measurement sound only. In the prior-art solutions, it is impossible to compute the flow velocity in such a situation of disturbance.

The object of the invention is to provide a novel method and device for acoustic flow measurement by whose means the drawbacks discussed above can be avoided.

In view of achieving the objectives stated above and those that will come out later, the method of the invention is mainly characterized in that, in the method, a sound speed at rest $c_0(T)$, which has been standardized or will be standardized for a certain temperature, is stored in the memory, and that the flow velocity and the other quantities that may be derived from same, if any, are computed, at least in situations of disturbance, by means of the detected downstream speed $v_d$ or of the detected upstream speed $v_u$ and by means of said sound speed at rest $c_0(T)$ stored in the memory. Above, the sound speed at rest means the sound speed in a medium that is at rest.

On the other hand, the device in accordance with the invention is mainly characterized in that the device comprises a host microprocessor or an equivalent logic unit and a memory connected with it, said microprocessor being fitted to control the operation of the device, that the device comprises a temperature detector, by whose means the temperature of the gas that flows in the measurement pipe is detected, that the device comprises a correlator, to which the sound signals coming from said microphones and detected from the measurement pipe or the signals derived from same are passed, and that said microprocessor has been connected with a program, on the basis of whose control the microprocessor is fitted to control the various sequences of operation and the computing of the measurement device, and, from the measured temperature, the sound speed at rest in the gas to be measured, which sound speed at rest has been standardized or will be standardized for a certain reference temperature, is stored constantly into the memory of the microprocessor, and that, on the basis of said program, the device is fitted, in a situation of disturbance, to compute the flow velocity on the basis of the downstream speed or upstream speed and on the basis of the above sound speed at rest.

A starting point of the invention is the observation that, in the composition of a gas, in particular in the composition of natural gas, as a rule, just little and, in any case, quite slow changes take place. Thus, a sound speed standardized for NTP-conditions is hardly changed, or if it is, the changes are relatively slow.

If the situation of disturbance discussed above occurs in the flow measurement, i.e. if the transit time of the measurement sound can be measured in one direction of measurement only, i.e. either downstream or upstream, in the invention it is preferable to form an average sound speed out of several successive measurement results and to use the sound speed thus obtained for precise computing of the flow velocity.

An essential component in the present invention is the microprocessor that controls the measurement, in whose memory a sound speed at rest $c_0(T)$ is constantly stored, which sound speed at rest has been standardized for an invariable temperature and has been obtained preferably as an average of several successive measurements, in which case the flow velocity can be computed from the formula (7), which will be given and dealt with later.

In the following, the invention will be described in detail with reference to an exemplifying embodiment of the invention illustrated in the FIGURE in the accompanying drawing, the invention being by no means strictly confined to the details of said embodiment.

The FIGURE is a schematic illustration of a device in accordance with the invention for measurement of a gas flow, primarily as a block diagram.

As is shown in the FIGURE, a gas flow running in the measurement pipe 10 is measured acoustically. Typically, the gas to be monitored is natural gas. Into the measurement pipe 10, sound signals are transmitted by means of loudspeakers 13a and 13b downstream and upstream, which sound signals are received by means of microphones 14a and 14b placed between the loudspeakers 13a and 13b, the mutual distance L between the microphones being essential for the monitoring. The diameter D of the measurement pipe 10 and the measurement interspace L are chosen, for example, so that $L \approx 10D$.

From the point of view of the measurement technology related to the invention, it is the most essential physical observation that in a pipe 10 with rigid walls, below a certain limit frequency, which depends on the dimensions of the pipe 10, exclusively a so-called planewave mode or piston mode can propagate, whose speed of propagation does not depend on local variations in the medium, in its temperature or flow velocity, but exclusively on the average values prevailing within the measurement distance (B. Robertson, "Effect of Arbitrary Temperature and Flow Profiles on the Speed of Sound in a Pipe", *J. Acoust. Soc. Am.*, Vol 62, No. 4, p. 813 ... 818, October 1977, and B. Robertson, "Flow and Temperature Profile Independence of Flow Measurements Using Long Acoustic Waves", *Transactions of the ASME*, Vol. 106, p. 18 ... 20, March 1984), which permits accurate flow measurement independent from the profile. For a pipe of circular section, said limit frequency $f_c$ can be calculated from the formula $$f_c = c/(1.7 \cdot D), \qquad (1)$$

wherein c is the speed of propagation of sound in the medium that fills the pipe, and D is the diameter of the pipe 10.

In the following, the most important formulae of calculation used in the flow monitoring in accordance with the invention will be given.

Sound speed [m/s] $c = 0.5 \cdot L \cdot (t_1^{-1} + t_2^{-1})$ (2)

Temperature-reduced sound speed[m/s] $c_0 = c \cdot \sqrt{(T_0/T)}$ (3)

Flow velocity [m/s] $v = 0.5 \cdot L \cdot (t_1^{-1} - t_2^{-1})$ (4)

Volumetric flow [cu.m/s] $Q = v \cdot A$ (5)

Mass flow [kg/s] $M = Q \cdot \rho$ (6)

v = average flow velocity
L = distance between microphones 14a and 14b
$t_1$ = transit time of sound downstream
$t_2$ = transit time of sound upstream
$T_0$ = reference temperature to which the sound speed $c_0$ has been reduced
T = temperature of gas in the measurement pipe 10
Q = volumetric flow
A = cross-sectional area of the pipe 10
M = mass flow
$\rho$ = density of gas According to the FIGURE, the loudspeakers 13a and 13b are fed alternatingly with electric signals received from the sweep generator 12. The alternation of the feed of the loudspeakers 13a and 13b is controlled by means of a switch 18 controlled by the host microprocessor 20. The receiving side of the acoustic measurement system comprises the above microphones 14a and 14b, placed at the distance of the measurement interspace L from one another, the output signal of said microphones being fed, by the intermediate of the amplifiers 16a and 16b, to the scannable filters 17a and 17b or equivalent, whose sweep band is controlled by the microprocessor 20. Said scannable filters 17a and 17b are connected to the polarity correlator 15.

According to the FIGURE, a gas-temperature T measurement detector 19 and a gas-pressure P measurement detector 21 are placed in the measurement pipe 10. From the detectors 19 and 21, the measurement information is passed to the host microprocessor 20, to which the data concerning the sound transit times $t_1$ downstream and the sound transit times $t_2$ upstream are also transferred from the polarity correlator 15. In stead of a microprocessor, it is possible to use some other, corresponding logic unit or units. On the basis of the above formula (2), the sound speed c in the gas to be monitored is computed and, on the basis of the formula (4), the flow velocity v of the gas is computed. From the microprocessor 20, the flow velocity v is transferred to the computing and/or display unit 22, in which the flow velocity v is displayed and, if necessary, recorded, e.g., by means of a plotter and, if necessary, based on the above formulae (5) and (6), the volumetric flow Q and/or the mass flow M is/are calculated, and they may also be displayed and/or recorded in the unit 22.

Since the sound speed in a gas is mainly dependent on the temperature and on the composition of the gas, which affects the sound speed mainly by the intermediate of the average molecular weight and to some extent also by the intermediate of the number of the degrees of freedom in the molecules, the sound speed in the gas also illustrates the composition of the gas and at least such considerable changes in the composition as can, if necessary, also be monitored in the way described in the FI Pat. Appl. 916103 mentioned above.

By means of the microprocessor 20, based on the above formula (2), the sound speed c is calculated by making use of the transit times $t_1$ and $t_2$. Further, when the information on the temperature T of the flowing gas is brought to the microprocessor 20 from the detector 19, on the basis of the above formula (3), $c_0 = c \cdot \sqrt{(T_0/T)}$, it is possible to determine the sound speed $c_0$ that has been reduced to the reference temperature $T_0$ given to the system. If necessary, the microprocessor 20 can also be programmed to operate as a reference and alarm unit, which gives the alarm when the reduced sound speed $c_0$ is above or below the given limit values. When the reduced sound speed $c_0$ remains within the given limits, the system considers that the composition of the gas is sufficiently homogeneous. When the reduced sound speed $c_0$ detected by the monitoring system is above said upper limit or below said lower limit, the system gives a suitable alarm signal. Alternatively, said limits can be arranged as dependent on temperature in a way corresponding to the reduction described above. An alarm activates more precise determination of the gas composition, e.g., chromatographically.

The facts stated above are primarily known in prior art from the FI patent mentioned above initially as well as from the applicant's FI patent applications, and the above description is meant to illustrate the background and one environment of application of the present invention.

In the following, the novel features characteristic of the present invention and a preferred exemplifying embodiment of the method and device of the invention will be described.

An essential component in the invention is the microprocessor 20, which controls the measurement and processes the measurement results and which includes the memory 20M. Further, the invention includes a program, which controls the various sequences of the measurement and of the computing of the measurement results. This program is not described here, because it is obvious for a person skilled in the art on the basis of what has been stated above and of what will be stated below.

When the measurement operates free of disturbance, i.e. when the sound transit times $t_1$ and $t_2$ can be measured both upstream and downstream, on the basis of these measurements, the sound speed prevailing in the gas to be measured is stored into the memory 20M of the microprocessor 20, and the results of several successive sound speed measurements c are formed as an average value, and the result obtained in this way is used for precise computing of the flow velocity v by means of the microprocessor 20 and the related program (not shown). Thus, in the memory 20M of the microprocessor 20 that controls the measurement in the present invention, a sound speed $c_0(T)$, which has been standardized for an invariable temperature and which has been obtained as an average value of several successive measurements, is always stored. The gas flow velocity v to be detected is calculated by means of the microprocessor 20 and the related program, with the aid of the individual downstream speed $v_d$ and upstream speed $v_u$, from the following formula:

$$v = p_d(v_d - c_0(T)) + p_u(c_0(T) - v_u) \quad (7)$$

In the above formula (7), T is the temperature measured during the measurement, to which temperature the NTP sound speed is reduced, and the weighting coefficients $p_d$ and $p_u$ are normally given the value 0.5, whereby $c_0(T)$ is reduced out of the formula. If the possibility of downstream measurement is lost, according to the invention, the weighting coefficients are chosen as:

$$p_d = 0, \; p_u = 1. \quad (8)$$

In a corresponding way, if the possibility of upstream measurement is lost, in the invention, the weighting coefficients are chosen as follows:

$$p_d = 1, \; p_u = 0. \quad (9)$$

In a preferred embodiment of the invention, in order that an optimal result could be achieved, the weighting coefficients $p_d$ and $p_u$ given above in the formula (7) are chosen as follows:

$$p_d = \frac{\sigma_u^2}{\sigma_d^2 + \sigma_u^2} \quad (10)$$

$$p_u = \frac{\sigma_d^2}{\sigma_d^2 + \sigma_u^2} \quad (11)$$

wherein $\sigma_d^2$ and $\sigma_u^2$ are the variances of $v_d$ and $v_u$. In such a case, the limit values that are obtained are:

$$\sigma_d^2 \to \infty : p_d \to 0 \; p_u \to 1$$

$$\sigma_u^2 \to \infty : p_d \to 1 \; p_u \to 0$$

if $\sigma_d^2 = \sigma_u^2 p_u = p_d = 0.5$.

The variances $\sigma_d^2$ and $\sigma_u^2$ given above in the formulae (10) and (11) can be computed on the basis of the measurement results of $v_d$ and $v_u$, which have been stored in the memory 20M of the microprocessor 20, by means of the program related to the microprocessor 20.

In the following, the patent claims will be given, and the various details of the invention may show variation within the scope of the inventive idea defined in said claims and differ from the details described above for the sake of example only.

We claim:

1. Method for acoustic flow measurement of the flow velocity (v) of gases in a measurement pipe, in which method a is transmitted into the measurement pipe (10) and, by means of two sound detectors (14a, 14b) mounted at a certain distance (L) from one another in the measurement pipe (10), the sound signals that propagate in the gas flow upstream are detected, the flow velocity (v) of the gas that flows in the measurement pipe (10) being measured by means of said sound signals, characterized by:

storing in memory a sound speed representing zero flow rate $c_0(T)$, which standardized for a certain temperature; and in response to a loss of measurement of either the detected downstream speed or the detected upstream speed of the sound signals, computing the flow velocity (v) by means of the detected downstream speed $v_d$ or of the detected upstream speed $v_u$ and by means of said sound speed representing zero flow rate $c_0(T)$ stored in the memory.

2. Method as claimed in claim 1, characterized in that the flow velocity (v) in the measurement pipe (10) is calculated by means of the individual downstream speed ($v_d$) or upstream speed ($v_u$) from the formula $$v = p_d(v_d - c_0(T)) - p_u(c_0(T) - v_u) \quad (7)$$

wherein $p_d$ = weighting coefficient of downstream speed
$p_u$ = weighting coefficient of upstream speed.

3. Method as claimed in claim 2, characterized in that, when the observation of the downstream speed ($v_d$) is lost because of disturbances in the measurement, said weighting coefficients are chosen as follows: $p_d = 0$ and $p_u = 1$, and that, in a corresponding way, when the result of measurement of the upstream speed ($v_u$) is lost, said weighting coefficients are chosen as follows:

$p_d = 1$ and $p_u = 0$.

4. Method as claimed in claim 1, characterized by constantly detecting both the downstream speed $v_d$ and the upstream speed $v_u$; and, in response either to a loss or to a substantial disturbance in the detection of any one of said flow speeds, $v_d$, $v_u$, moving control of the process, being controlled by a microprocessor (20) that controls the measurement by a program that operates in connection with the microprocessor, over to a measurement mode in which the measurement is based on, and takes place by means of, the flow speed $v_d$ or $v_u$ detected in one direction only and the sound speed $c_0(T)$ at rest stored in the memory (20M) of the microprocessor (20) and standardized for a reference temperature $T_0$.

5. Method as claimed in claim 2, characterized in that said weighting coefficients (pd and pu) are determined from the following formulae:

$$p_d = \frac{\sigma_u^2}{\sigma_d^2 + \sigma_u^2} \quad (10)$$

$$p_u = \frac{\sigma_d^2}{\sigma_d^2 + \sigma_u^2} \quad (11)$$

wherein $\sigma_d^2$ and $\sigma_u^2$ are the variances of $v_d$ and $v_u$.

6. Apparatus for measurement of the gas flow velocity (v) or of quantities derived from same, such as volumetric flow (Q) or mass flow (M), which device comprises a measurement pipe (10) in which the gas flow to be measured runs, one or more loudspeakers (13a, 13b) as the transmitters of the sound signals and microphones (14a, 14b) as the sound detectors, said microphones being placed in connection with the measurement pipe (10) at a certain known distance (L) from one another, a signal generator (12) or equivalent, by whose means electric signals are fed to said loudspeaker (13a, 13b), and a correlator (15), to which the signals received from said microphones (14a, 14b) are fed, characterized in that the apparatus comprises:

a host microprocessor (20) or an equivalent logic unit and a memory (20M) connected with the microprocessor, said microprocessor (20) being operative to control the operation of the apparatus, a temperature detector (19), by whose means the temperature of the gas that flows in the measurement pipe (10) is detected, a correlator (15), to which the sound signals coming from said microphones (14a, 14b) and detected from the measurement pipe or the signals derived from same are passed, said microprocessor (20) being operative to store into memory (20M) the measured temperature (T) and the sound speed representing zero flow rate ($c_0(T)$) in the gas to be measured, which sound speed has been standardized for a certain reference temperature ($T_0$), and the microprocessor (20) being operative in a situation of disturbance wherein one of either the upstream speed or downstream speed cannot be measured, to compute the flow velocity in the measurement pipe on the basis of the downstream speed ($v_d$) or upstream speed ($v_u$) and on the basis of the above sound speed ($c_0(T)$) at rest.

7. Device as claimed in claim 6, characterized in that the device comprises two frequency-scanned filters (17a, 17b) or an equivalent system of filters, through which the signals coming from said microphones (14a, 14b) are fed to said correlator (15).

8. Device as claimed in claim 6, characterized in that the device comprises a pressure detector (21), which is fitted to measure the pressure of the gas that flows in the measurement pipe (10), and that the pressure-measurement signal (P) of said pressure detector (21) is passed to said microprocessor (20).

9. Device as claimed in claim 6, characterized in that said correlator is a polarity correlator (15).

10. Device as claimed in claim 6, characterized in that the microprocessor (20) is also controlled to operate as a reference and alarm unit, which gives the alarm when the reduced sound speed ($c_0(T)$) is above or below the limit values that have been fed to the device, the primary object being to monitor the homogeneity of the composition of the gas.

* * * * *